United States Patent Office 2,708,638
Patented May 17, 1955

2,708,638

CELLULOSE LOWER ALKANOATES STABILIZED WITH RESORCINOL MONO-PIPERONYLATE

Lester W. A. Meyer and Margaret H. Broyles, Kingsport, Tenn., assignors to Eastman Kodak Company, Rochester, N. Y., a corporation of New Jersey No Drawing. Application April 14, 1954,
Serial No. 423,239

3 Claims. (Cl. 106—176)

As is well known in the art, plastics having excellent properties for a great many purposes can be prepared from cellulose organic acid esters, such, for example, as cellulose acetate, cellulose propionate, cellulose butyrate, cellulose acetate-propionate and cellulose acetate-butyrate, with suitable plasticizers. Many examples of suitable plasticizers are shown in the art. The choice of plasticizers forms no part of our invention.

However, cellulose organic acid ester plastics have not been entirely suitable for use in places where they are exposed to a considerable amount of ultraviolet light: e. g. out of doors. After one or two months of outdoor exposure in a sunny climate, the plastic bleached and became increasingly brittle until, at the end of from three to six months, depending on the severity of the climate, crazing occurred. The rapid deterioration of appearance was accompanied by an equally rapid breakdown in physical properties, such as strength.

Some compounds whose addition to the plastic composition inhibited physical breakdown of the plastic, caused intense discoloration when the plastic was exposed for any length of time to sunlight or other source of ultraviolet light.

We have found that the addition of a small proportion of resorcinol mono-piperonylate

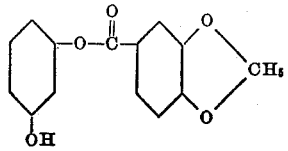

to a cellulose organic acid ester plastic composition strongly inhibits breakdown of the resulting plastic by exposure to ultraviolet light. We prefer to use approximately 0.75% to 5% of resorcinol mono-piperonylate, based on the weight of cellulose organic acid ester. Higher amounts give only slightly greater weathering resistance, and may change the physical properties of the plastic. As cellulose organic acid esters, we have employed those mentioned above, in which the acyl groups contain from 2 to 4 carbon atoms. Cellulose acetate plastics are not as effective for outdoor uses as are the mixed and higher esters, that is, those containing an acyl group higher than acetyl, because the usual cellulose acetate plasticizer retention is rather poor under outdoor exposure.

Resorcinol mono-piperonylate was prepared as follows: 273 grams (1.6 moles) of piperonylic acid, 440 grams (4 moles) of resorcinol, 251.2 grams (1.6 moles) of phosphorus oxychloride (POCl₃), and 4 liters of benzene were refluxed together for 7 hours. The dark red benzene solution was washed twice with water while still hot. The benzene layer was cooled to room temperature where the product crystallized out and was collected on a filter pad. The solid was washed with water several times before dissolving in methanol and reprecipitating by adding water. This process was repeated twice to remove most of the color present. A 5% Nuchar treat at 60° C. gave a white product while the original sample was yellow.

The following analysis was made of a representative sample: melting point, 148–9° C., calculated percent OH, 6.42, theoretical percent OH, 6.58, percent of acid, 0.10, theoretical percent C, 65.12, calculated percent C, 64.37, theoretical percent H, 3.90, calculated percent H, 4.02.

In testing our cellulose organic acid ester plastics containing resorcinol monopiperonylate, we have tested sheets of 0.05" thickness by the Kline test, designated as A. S. T. M. D795–49. The method consists of the following test cycle:

18 hours under General Electric S–1 sunlamp (6 inches below lamp)
2 hours in fog chamber
2 hours under S–1 sunlamp
2 hours in fog chamber This cycle was repeated until the first sign of surface failure of the samples of plastic, as shown by dulling, chalking, checking, crazing, warping, or discoloration. The temperature inside the accelerated weathering machine is maintained at 55° to 50° C.

It has been found by the National Bureau of Standards and verified by us, that roughly 200 hours' sunlamp exposure by this test is equivalent to one year's outdoor exposure in Washington, D. C. Outdoor exposure farther south or at high altitude is more severe, however.

The following table shows the values obtained by weathering similar samples of plasticized cellulose acetate-butyrate plastics of the same compositions, containing (a) no ultraviolet inhibitor, (b) the well-known ultraviolet inhibitor, phenyl salicylate, and (c) resorcinol monopiperonylate. Concentrations of inhibitor are given in per cent, based on the weight of cellulose ester. The numbers in the "Color of Plastic" column indicate the relative intensity of coloration of the samples.

| Inhibitor | Concn. | Hours to Failure | Color of Plastic | |
|---|---|---|---|---|
| | | | Start of Test | End of Test |
| None | | 200–250 | | |
| Phenyl salicylate | 0.1 | 300 | 4 | 6 |
| | 0.25 | 400 | 4 | 4 |
| | 0.50 | 500 | 4 | 6 |
| | 0.75 | 600 | 4 | 6 |
| | 1.0 | 600 | 4 | 6 |
| | 1.5 | 684 | 4 | 6 |
| | 2.0 | 784 | 4 | 6 |
| | 3.0 | 884 | 4 | 6 |
| Resorcinol mono-piperonylate | 0.1 | 240–300 | 4 | 6 |
| | 0.25 | 500–540 | 4 | 6 |
| | 0.50 | 799–825 | 4 | 6 |
| | 0.75 | 1,140 | 4 | 8 |
| | 1.0 | 1,290 | 4 | 8 |
| | 1.5 | 1,383 | 4 | 8 |
| | 2.0 | 1,499 | 4 | 15 |
| | 3.0 | 1,970 | 4 | 15 |

At the end of the number of hours shown in the table, the failure in all samples containing more than 0.1 part of either inhibitor consisted in slight checking or slight fine crazing. Samples containing 0.1 part of inhibitor broke or were brittle.

Resorcinol mono-piperonylate is advantageously introduced into a cellulose organic acid ester plastic at the time the cellulose ester is compounded with the plasticizer. This compounding may be accomplished by any of the known methods, including the method of working on hot rolls described in Conklin's U. S. Patent 2,155,303. Resorcinol mono-piperonylate causes no substantial discoloration of the plastic, even when the hot-rolling method of compounding is employed, and no substantial discoloration takes place during accelerated testing.

By way of application, we give the following example of making up cellulose organic acid ester plastics containing resorcinol mono-piperonylate. It will be understood that this illustration does not constitute a limitation of our invention, which is defined in the appended claims.

*Example.*—100 parts of cellulose acetate-butyrate containing approximately 12% acetyl and 37% butyryl is intimately mixed in a sigma-blade mixer with 13 parts of dibutyl sebacate and 1 part of resorcinol mono-piperonylate. The mixture is worked on hot rolls by the method described in the Conklin Patent 2,155,303. The resulting plastic can then be granulated and be ready for any molding or extrusion operation.

Any of the known plasticizers for cellulose organic acid esters, such, for example, as dibutyl phthalate, dibutyl sebacate, methoxyethyl stearate, tricresyl phosphate, butoxyethyl phthalate, diamyl phthalate, ethyl p-toluene sulfonamide, etc. may be used. In the case of the softer cellulose esters, such as cellulose acetate-butyrate, plastics may even be formed without the use of any plasticizer.

What we claim as our invention and desire to be secured by Letters Patent of the United States is:

1. A cellulose organic acid ester plastic comprising a cellulose organic acid ester selected from the group consisting of cellulose acetate, cellulose propionate, cellulose butyrate, cellulose acetate-propionate and cellulose acetate-butyrate, a plasticizer therefor, and, as an agent for inhibiting deterioration of the plastic by ultraviolet light, approximately 0.75% to 5%, based on the weight of the cellulose ester, of resorcinol mono-piperonylate.

2. A cellulose acetate-butyrate plastic comprising cellulose acetate-butyrate, a plasticizer therefor, and, as an agent for inhibiting deterioration of the plastic by ultraviolet light, approximately 0.75% to 5%, based on the weight of the cellulose acetate-butyrate, of resorcinol mono-piperonylate.

3. A cellulose acetate-butyrate plastic comprising cellulose acetate-butyrate and, as an agent for inhibiting deterioration of the plastic by ultraviolet light, approximately 0.75% to 5%, based on the weight of the cellulose acetate-butyrate, of resorcinol mono-piperonylate.

No references cited.